(12) United States Patent
Mortensen et al.

(10) Patent No.: US 7,726,942 B2
(45) Date of Patent: Jun. 1, 2010

(54) CONNECTOR BOX PARTLY EMBEDDED IN A FIBRE-REINFORCED PART FOR PROTECTING AND CONNECTING PURPOSES

(75) Inventors: Ivan Engmark Mortensen, Kolding (DK); Lars Erik Jensen, Hedensted (DK)

(73) Assignee: LM Glasfiber A/S, Lunderskov (DK)

( * ) Notice: Subject to any disclaimer, the term of this patent is extended or adjusted under 35 U.S.C. 154(b) by 686 days.

(21) Appl. No.: 10/586,902

(22) PCT Filed: Jan. 24, 2005

(86) PCT No.: PCT/DK2005/000046

§ 371 (c)(1),
(2), (4) Date: Sep. 18, 2006

(87) PCT Pub. No.: WO2005/071383

PCT Pub. Date: Aug. 4, 2005

(65) Prior Publication Data

US 2007/0160338 A1 Jul. 12, 2007

(30) Foreign Application Priority Data

Jan. 23, 2004 (DK) ............................... 2004 00093

(51) Int. Cl.
*B64C 27/473* (2006.01)
*F01D 5/14* (2006.01)
(52) U.S. Cl. ...................... 416/5; 416/146 R; 416/230; 416/241 A
(58) Field of Classification Search ...................... 416/5, 416/146 R, 230, 241 A
See application file for complete search history.

(56) References Cited

U.S. PATENT DOCUMENTS

| 4,976,587 | A | * | 12/1990 | Johnston et al. | ............. 416/230 |
| 5,533,165 | A | | 7/1996 | Burris et al. | |
| 6,457,943 | B1 | * | 10/2002 | Olsen et al. | ................. 416/230 |
| 6,612,810 | B1 | * | 9/2003 | Olsen et al. | .................... 416/95 |
| 6,615,875 | B2 | * | 9/2003 | Adolphs et al. | ................ 138/98 |
| 6,619,918 | B1 | * | 9/2003 | Rebsdorf | ........................ 416/1 |
| 6,800,956 | B2 | * | 10/2004 | Bartlett | ........................ 290/55 |
| 7,364,407 | B2 | * | 4/2008 | Grabau et al. | ............ 416/229 R |

FOREIGN PATENT DOCUMENTS

JP 03111526 A * 5/1991

* cited by examiner

*Primary Examiner*—Edward Look
*Assistant Examiner*—Sean J Younger
(74) *Attorney, Agent, or Firm*—Day Pitney LLP (57) ABSTRACT

The present invention relates to a connector box adapted to be at least partly embedded in a fiber-reinforced part of a wind turbine, where said connector box comprises a flexible base part and a sealing part. The sealing part seals off and protects at least one compartment between the sealing part and the base part during manufacture of said fiber-reinforced part, but can be partly removed after manufacture making said compartment accessible. The base part is adapted to fasten the connector box in the fiber-reinforced part by having a larger circumference near its bottom than near its top. Further, the invention relates to such a connector box fixating a part of an element in the compartment of the box and making a second part of the element accessible from the compartment after manufacture.

11 Claims, 6 Drawing Sheets

Fig. 8

CONNECTOR BOX PARTLY EMBEDDED IN A FIBRE-REINFORCED PART FOR PROTECTING AND CONNECTING PURPOSES

FIELD OF THE INVENTION

The present invention concerns a connector box adapted to be at least partly embedded in a fibre-reinforced part of a wind turbine with the purpose of protecting sensitive parts during manufacture and enabling accessibility after the manufacture. The invention further relates to a blade for a wind turbine containing such connector boxes.

BACKGROUND OF THE INVENTION

Sensors and other means for measurements are often connected to large fibre-reinforced structures such as parts for wind turbines, ship hulls, parts on aircrafts, etc. This includes, for instance, strain gauges for measuring the loads on the structure and its response, devices for temperature or pressure measurements, GPS receivers, lights, lightning conductors, data registration units, etc. The application of such devices or sensors then also naturally in most cases requires the guiding of elements for their functioning such as electrical wires, optical fibres, cables or the like going from somewhere practical in the structure to where the devices or sensors are placed. For instance, an optical fibre running along the length of a blade for a wind turbine being connected at its ends to light emission and receiving equipments placed near the root of the blade.

All these different elements mentioned above are often partly or totally embedded in the fibre-reinforced structure. One reason for this is that the bonding to the fibre-reinforced part in this way is far stronger than when fastened externally onto the structure by e.g. mechanical means or glue. Also, embedding can be advantageous for aerodynamically reasons. Furthermore, the element is in this way 'wrapped' by the fibre-reinforced structure and is thus kept well protected and safe.

It is, however, a problem when the element is to be connected to another part and thus must protrude from the fibre-reinforcement in some way to be accessible from the outside. In the marine industry it is practice to simply pull out the part of the element that needs to be accessible—typically the end—through the top layers, the injection layer and the vacuum foil before the injection of the resin into the part. However, this unavoidably reduces the quality of the injection of the resin and thus the overall quality of the fibre-reinforced structure. Furthermore, the element is easy to damage by this handling and is vulnerable during the injection, thus increasing the cost of the production and the end-product as well as increasing the risk of a malfunctioning element which is difficult or impossible to repair as the element is embedded in the structure.

OBJECT AND SUMMARY OF THE INVENTION

It is therefore an object of this invention to obtain a connector box which can be partly or totally embedded in a fibre-reinforced part, in which the end of an electrical wire, optic fibre, cable or the like can be protected and hold safely in place during the manufacture of the laminate, but still be accessible to connection to other devices after manufacture. Further objects appear from the description elsewhere.

The invention relates to a connector box adapted to be at least partly embedded in a fibre-reinforced part of a wind turbine, where said connector box comprises a base part and at least one sealing part, where the sealing part seals off and protects at least one compartment between the sealing part and the base part during manufacture of said fibre-reinforced part, and which sealing part can be partly removed after manufacture making said compartment accessible, and where said base part is adapted to fasten the connector box in the fibre-reinforced part by having a larger circumference near its bottom than near its top. This is advantageous in that it reveals a simple yet robust box which can be embedded into the fibre-reinforced part without decreasing the strength of the part noticeable and with a very strong bond to the part. Furthermore, the geometry of the box will ensure that the box stays firmly in place during and after manufacture. Also the problem of having to cut in the vacuum foil in order to attain accessibility to an element is removed. Such a connector box is easy to handle and employ under manufacturing conditions for fibre-reinforced parts, even when personnel has to wear personal protection equipment such as thick gloves, etc. It is also advantageous that the box can be placed anywhere needed on a part even on uneven or curving surfaces. Furthermore, it is easy to orientate in special ways if required.

The invention further relates to a connector box as described above and wherein a first part of the compartment is fixating one part of at least one element, and wherein another part of the element is accessible from a second part of the compartment. Apart from the above-mentioned advantages, a way to fasten parts of elements that are more or less embedded in the structure in such a way that the part is kept firmly at place both during and after the manufacture is hereby obtained. Also, vulnerable parts are in this way well protected by the connector box, thus reducing the risk of damaging the parts. A further advantage is that the element is made accessible after the manufacture due to the design of the connector box so that it is possible and simple to connect any exterior device to the otherwise embedded element. This connection can also be done at any time suitable independent of the production of the fibre-reinforced part itself which both makes it possible to obtain a better quality of the product and even makes it possible to change the functionality of the connection by connecting different devices over time.

In one embodiment of the invention, the first part of the compartment of the connector box is at least partly filled with a cured material thereby fixating said part of the element. This embodiment reveals a simple yet effective and cost-efficient way to partly fixate the element during and after manufacture.

In another embodiment of the invention, the sealing part of the connector box consists of a sealing bag. In this way it is easy to get access to the interior or the compartment in the connector box after manufacture. The sealing bag furthermore keeps the resin out efficiently. A further advantage is that the bag protects the outer surface of the connector box so that it will appear with a better finish after removal of the bag.

In a further embodiment of the invention, the element in the connector box comprises a current conducting part and a connector part, wherein the current conducting part is at least partly fixated in the first part of said compartment, and wherein the connector part is accessible from the second part of the compartment. This is advantageous when there is a need for having an electrical wire connected to some device; for instance when placing a obstructing light at the tip of a blade for a wind turbine.

In yet another embodiment of the invention, the element comprises an optical fibre and a connector part, wherein the optical fibre is at least partly fixated in the first part of the compartment, and wherein the connector part is accessible from the second part of the compartment. The connector part described above can also be adapted for connection of light emitting means or light receiving means to the optical fibre. This is advantageous when an optical fibre is used for e.g. strain or temperature measurements on the blade for a wind turbine. As the optic fibre is very fragile and vulnerable it is easy to damage the fibre during the manufacture as well as afterwards when connecting it to e.g. light receiving and emission means. This risk is minimized when using a connector box as described above.

In one embodiment of the invention, the connector box according to the above is made completely or partly of a plastic. This comprises, for instance, PVC or POM which are both inexpensive materials and materials with low weight. Furthermore, they possess good manufacturing properties.

In one embodiment of the invention, the sealing part of the connector box according to the above is made of a resin-proof plastic. This makes the sealing part easy to cut open or rip off when needed and is at the same time an inexpensive material. Furthermore, the connector box is easily wrapped in and sealed off before use in the manufacturing process.

In one embodiment of the invention, the base part of the connector box according to the above is made of a flexible material. This could for instance be rubber or another resin-proof material. By being flexible, the base part evens out the differences in material properties from the fibre-reinforced material to the relatively hard connector box.

The invention further relates to a blade for a wind turbine characterized by comprising a connector box according to one or more of the embodiments mentioned above. The advantages hereof are as described above for the connector box, among others a far better opportunity to make a connection from some kind of external device to elements more or less embedded in the is blade. This can be done in a safer, simpler, and more cost-effective way than otherwise obtained with prior art.

Finally, the invention relates to a blade according to the above, wherein said connector box is at least partly embedded in a part of a blade shell so that the connector box is accessible after manufacture. By partly embedding the connector box, a better fastening to the blade is obtained with the added possibility of making the connection of the sensor or device at the time most suitable independent of the manufacture of the blade itself.

BRIEF DESCRIPTION OF THE DRAWINGS

In the following, the invention is described with reference to the drawings, which display examples of embodiments of the invention.

DESCRIPTION OF PREFERRED EMBODIMENTS

Figure 1:
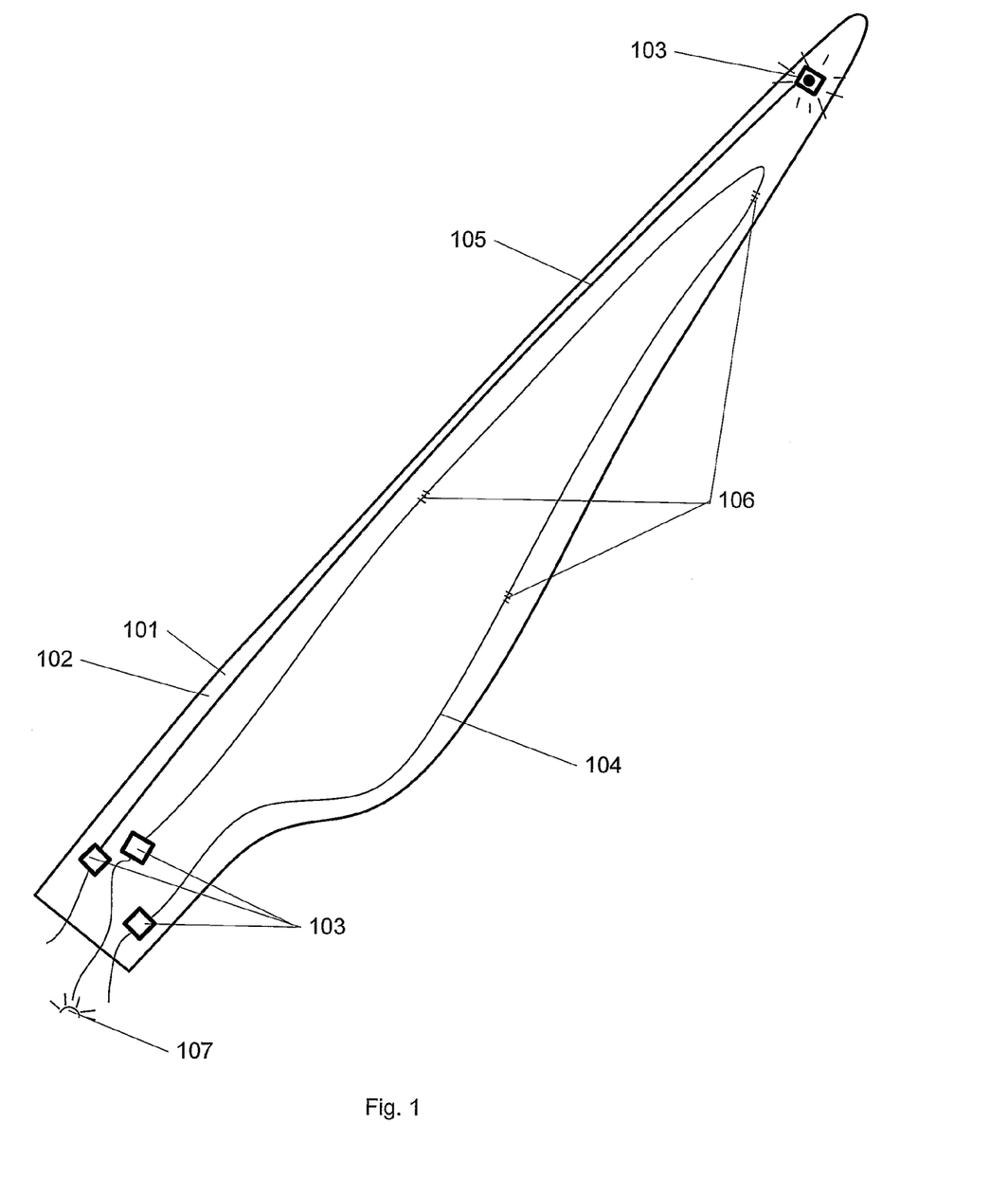
FIG. 1 shows one part of a blade for a wind turbine according to the invention.

FIG. 1 displays a blade 101 for a wind turbine comprising a fibre-reinforced blade shell 102. A number of connector boxes 103 are in this design placed near the root and near the tip of the blade, respectively. Two of the boxes near the root of the blade are connected to the ends of an optical fibre 104. An electrical wire 105 is led from the root to the tip and connected to a box in each end running in this sketched embodiment along the length of the blade. Such an electrical wire 105 embedded partly or totally in the blade could be used, for instance, for applying obstructing lights on the blade tip, or used to connect to and run some other sensor or device with a technical feature. The optical fibre 104 can among other things be used for measuring the strains and temperatures at positions on the blade, where a number of Bragg gratings 106 (illustrated by small hatches) are placed in the fibre. The fibre is then connected to light emission and/or light receiving means 107 in the connector boxes. As an optical fibre is very fragile, special care has to be taken during the production of the blade in order not to damage the fibre. By fastening the end of the optical fibre in a connector box 103 according to this invention, where the connector box can then be at least partly embedded in the fibre-reinforced structure, the fibre is kept well-protected and safe during the manufacture of the structure. Furthermore, after the manufacture the box facilitates the connection of the fibre to any kind of external device such as the light emission or receiving means in this example.

Figure 2:
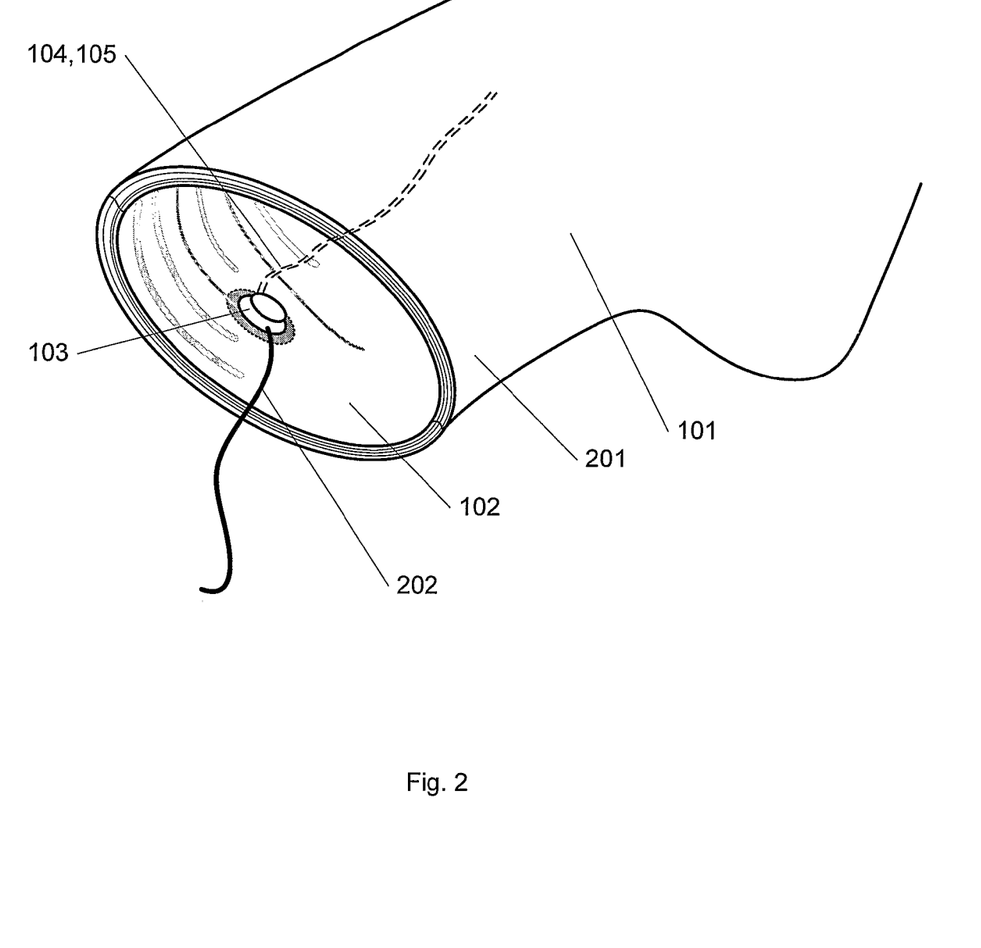
FIG. 2 shows a closer view of the root part of a blade.

FIG. 2 shows a closer view in perspective of the root 201 of the blade 101 with a connector box 103 according to the invention partly embedded in the fibre-reinforced blade shell 102. The dimension of the connector box 103 is exaggerated for clarity. The box is accessible from the interior of the blade so that it is possible and simple to connect or disconnect different apparatuses 202 according to the purpose such as for instance light emission or light receiving means to an inner optical fibre 104, a computer for collecting data gathered in other positions of the blade, etc. The connector box 103 is in this figure depicted as being accessible from the inside of the blade, but in a different embodiment of the invention, the connector box is placed next to the outer surface of the blade shell, preferably in level with the surface for aerodynamically reasons. The box is then accessible from the outside and could then be used for e.g. putting lights on the blade near the tip as illustrated in FIG. 1. Another possibility is to use the connector box to place some kind of sensor at various places along the blade. This could for instance be a GPS, a temperature sensor, an accelerometer or even a flashing commercial. The connector box 103 then makes the connection of the different sensors robust and simple, and makes it possible to use e.g. an electrical current 105 or an optical fibre 104 for different things according to specific needs, even if they change in time. A further advantage of the invention is that the connection of the different external devices can now take place after production of the blade independently of the manufacture. This then makes the connection of fragile parts easier and safer, thus lowering the risk of damaging the parts.

Figure 3:
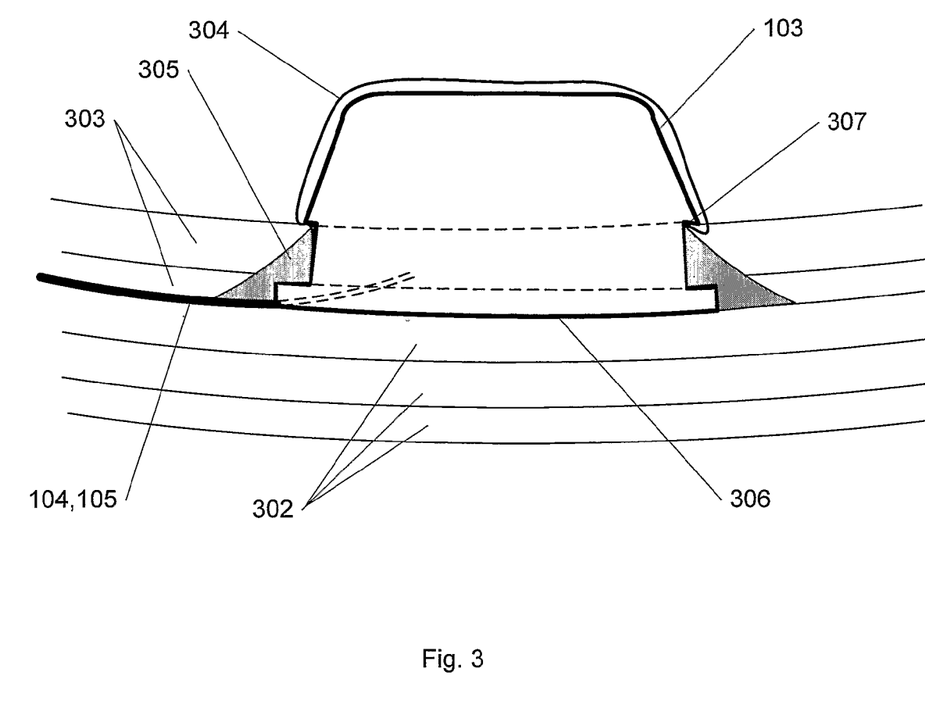
FIG. 3 shows the outline of a connector box imbedded in a laminate.

FIG. 3 displays the outline of a particular embodiment of a connector box 103. The connector box comprises a base part 305 around its lower part. In one embodiment, the base part 305 is made of a flexible resin-proof material such as a rubber. The connector box is partly embedded in a fibre-reinforced structure 308 by placing it on top of the first layers 302 in the laminate together with the optical fibre 104 or electrical wire 105 and then adding the last layers 303 around the box as illustrated in the figure. An injection layer, the injection channels for the resin, and a vacuum foil (not shown in the figure) are placed on top and resin is infused in a state where air is evacuated, such as in a VARTM process (Vacuum Assisted Resin Transfer Moulding). The connector box can also equally well be built in by other moulding processes such as simple hand lay-up. The base part is shaped so that its circumference is larger near the bottom of the connector box than near its top.

Or in other words, the base part is larger down in the fibre-reinforced part than near the surface of the part. In this way the base part 305 acts to keep the box 103 firm in place during and after manufacture of the laminate. To protect the interior of the connector box 103, a sealing part in the shape of a sealing bag 304 covers the box partly or totally. After manufacture of the laminate, the sealing bag 304 can simply be removed or pealed off the box leaving the interior of the connector box accessible. The sealing bag 304 can be made of a plastic resin-proof foil. The sealing 304 part also acts to protect the outer surface of the connector box 103 during manufacture so that the box has a high finish after removal of the bag. Alternatively, the sealing part could also consist of a more or less rigid lid which is cut open after manufacture of the laminate.

In the example shown in the figure, the fibre-reinforced structure curves a is little. Therefore the lower surface 306 of the connector box 103 curves accordingly to minimize the influence of the connector box on the properties of the laminate. Furthermore, the flexible base part 305 evens out the transition from the relatively soft fibre-reinforced material to the relatively stiff box 103. Also, in this embodiment of the invention the sealing bag 304 is kept in place by the base part 305. A further important detail on the box design is the recess 307 just above the flexible base part 305. This recess 307 helps to hold the base part 305 in place, makes a better overall finish and acts as a cutting or grinding edge for removal of the top sealing bag 304.

Figure 4:
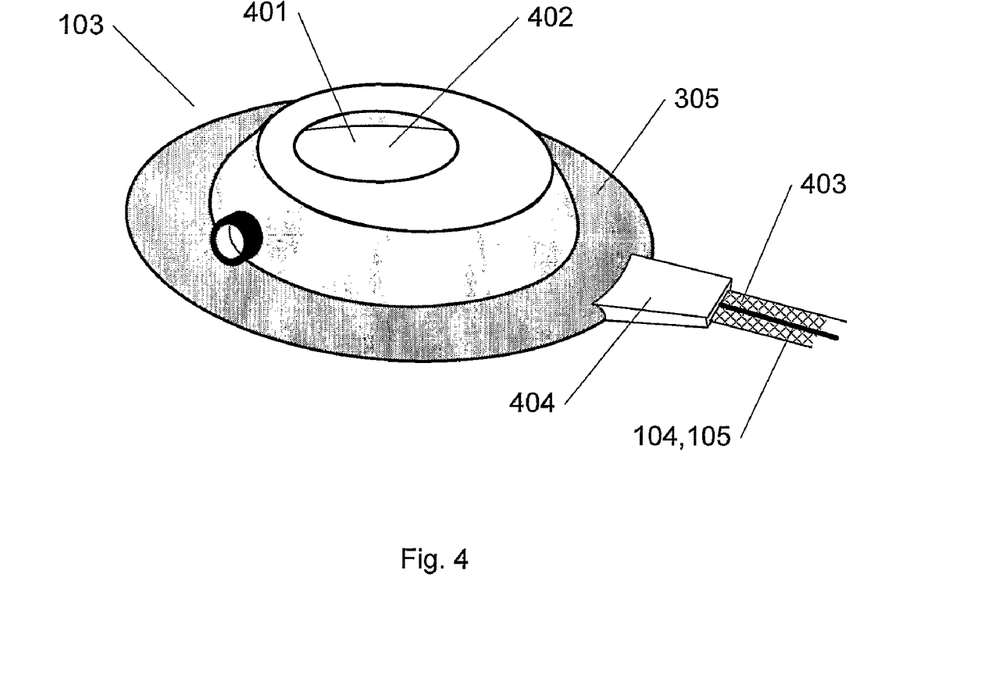
FIGS. 4 and 5 show a connector box seen from above and from below, respectively.
Figure 5:
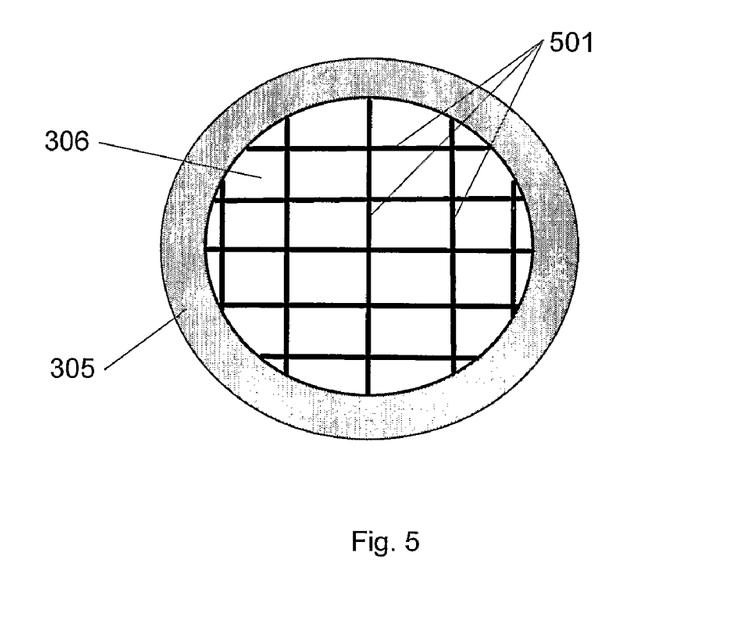

In FIGS. 4 and 5 the connector box 103 without the sealing part is seen in perspective from above and below, respectively. As described above, the connector box 103 comprises a flexible base part 305. The connector box 103 comprises further a compartment 401 which is accessible after embedding the box in a structure through an opening 402 e.g. in the top of the connector box. The element to be protected by the box (for instance an optical fibre 104 or a current conducting part 105) is supported by a string 403 along its length and a tapered, elongate and resilient portion 404 leading the element into the connector box 103 partly under the base part 305. The element 104, 105 thus ends inside the connector box 103 in which it can be connected to exterior parts. As can be seen in FIG. 5, a number of grooves 501 are machined into the lower surface 306 of the housing of the connector box 103. During injection these ensure a flow of resin into the fibre-reinforced layers situated underneath the connector box. The grooves are cut in two different directions for optimal flow.

Figure 6:
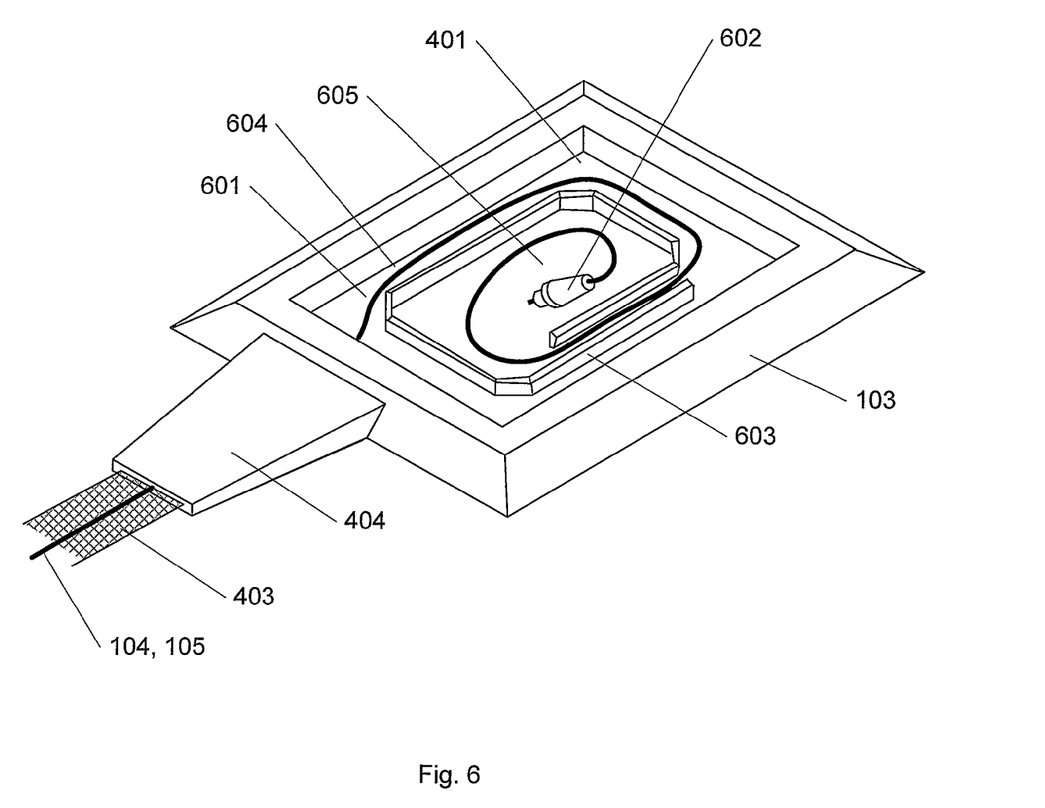
FIG. 6 shows an elevated view of another embodiment of a connector box.

FIG. 6 shows a different design of a connector box 103 in the general shape of a truncated pyramid. An optical fibre 104 or an electrical wire 105, which is supported by a string 403, is via a tapered, elongate and resilient portion 404 led into a compartment 402 in the connector box 103. The optical fibre or wire is fixated with e.g. resilient glue 601 in a first part of the compartment 604 and ends in a free connector part 602 such as for instance a plug of some kind in a second part of the compartment 605. To ease placing the fibre 104 or electrical wire 105 in the compartment and holding this in place while the glue 601 is curing, a wall 603 may be placed in the compartment, or it may be machined or cast when the connector box 103 is made. The connector box 103 will in use be covered by e.g. a plate, preferably resting on an undisplayed seal to form a tight connection. The connector box 103 may preferably be made from a polymeric material such as e.g. POM by processes involving casting, milling or the like. Preferably all the parts in the connector box are made essentially without using e.g. any metallic parts to maintain a generally low risk of a lightning strike. The connector part 602 may though include metallic plugs for connecting an optical fibre 104 or an electrical wire 105 to any external devices such as means for emitting and receiving light or a diode.

Figure 7:
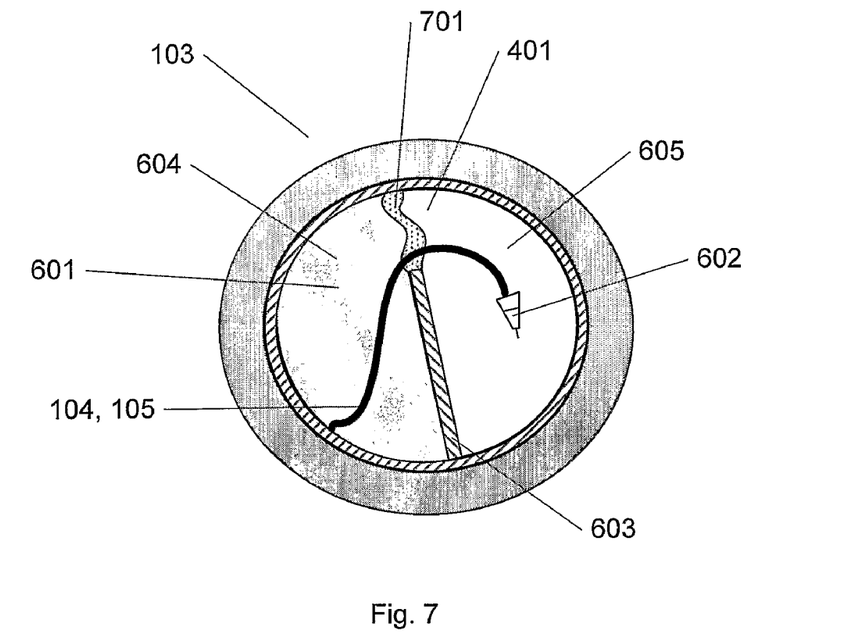
FIGS. 7 and 8 show different ways of fixating an element in a connector box.

FIG. 7 illustrates a connector box 103 comprising a compartment 401 in which it fixates an element 104, 105 in a first part of the compartment 604 leaving the element to be free and accessible from a second part of the compartment 605. As mentioned earlier, the element could be the end of a sensitive optical fibre 104 or an electrical wire 105 connected to a connector part 602. The element is fixated either mechanically or by some kind of cured material such as glue 601. In order to ease the fixating of the element, the two parts of the compartment 604 and 605 can be partly separated by a wall 603 which also can help the sealing bag to stay in place and keep the resin out of the compartment 401 during injection. To keep the glue or curing material 601 from filling the whole compartment one can apply a small amount of e.g. silicon 701. By its flexibility, this further helps to support the often fragile element when leaving the relatively hard fixating and cured material 601. In another embodiment, a lid is placed over the compartment during manufacture to help preventing the sealing bag from being pressed down into the compartment during the resin injection.

Figure 8:
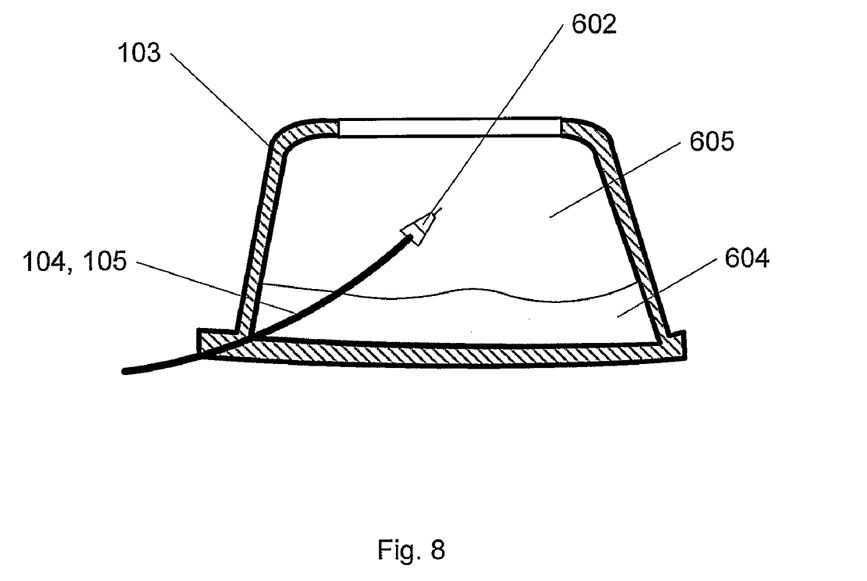

Another embodiment of a connector box 103 is shown in FIG. 8. Here the element 104, 105 is fixated in a first part of a compartment 604 in the box which part covers the bottom part of the box. The element with the connector part 602 then sticks up from the cured material and is accessible from a second part of the compartment 605 being in this embodiment the top of the connector box.

It is to be understood that the invention as disclosed in the description and in the figures may be modified and changed and still be within the scope of the invention as claimed hereinafter.

The invention claimed is:

1. A connector box (103) adapted to be at least partly embedded in a fibre-reinforced part of a wind turbine, where said connector box (103) comprises a base part (305) and at least one sealing part (304), consisting of a sealing bag, where said sealing bag seals off and protects at least one compartment (401) between the sealing bag and the base part (305) during manufacture of said fibre-reinforced part, and which sealing bag is partly removable after manufacture making said compartment (401) accessible, and where said base part (305) is adapted to fasten the connector box (103) in the fibre-reinforced part by having a larger circumference near its bottom than near its top.

2. A connector box according to claim 1, wherein a first part of said compartment (604) is fixating one part of at least one element (104,105) and wherein another part of said at least one element (104,105) is accessible from a second part of said compartment (605).

3. A connector box according to claim 2, wherein said first part of said compartment (604) is at least partly filled with a cured material (601) thereby fixating said one part of at least one element (104,105).

4. A connector box according to claim 2, wherein said at least one element (104, 105) comprises a current conducting part (105) and a connector part (602), wherein said current conducting part (105) is at least partly fixated in said first part of said compartment (604), and wherein said connector part (602) is accessible from said second part of said compartment (605).

5. A connector box according to claim 2, wherein said at least one element (104, 105) comprises an optical fibre (104) and a connector part (602), wherein said optical fibre (104) is at least partly fixated in said first part of said compartment (604), and wherein the connector part (602) is accessible from said second part of said compartment (605).

6. A connector box according to claim 5, where said connector part (602) is adapted for connection of light emitting means or light receiving means (107) to the optical fibre (104).

7. A connector box (103) according to claim 1, made completely or partly of plastic.

8. A connector box according to claim 1, where the at least one sealing part (304) is made of a resin-proof plastic.

9. A connector box according to claim 1, where the base part (305) is made of a flexible material.

10. A blade for a wind turbine (101) characterized by comprising a connector box (103) according to claim 1.

11. A blade according to claim 10, wherein said connector box (103) is at least partly embedded in a part of a blade shell (102) so that the connector box (103) is accessible after manufacture.

* * * * *